(12) United States Patent
Gonzalez et al.

(10) Patent No.: US 7,803,958 B2
(45) Date of Patent: Sep. 28, 2010

(54) CROSSLINKERS CONTAINING SILANE

(75) Inventors: Sergio Gonzalez, Southfield, MI (US); Timothy S. December, Rochester Hills, MI (US)

(73) Assignee: BASF Coatings GmbH, Muenster (DE)

( * ) Notice: Subject to any disclaimer, the term of this patent is extended or adjusted under 35 U.S.C. 154(b) by 868 days.

(21) Appl. No.: 11/685,264

(22) Filed: Mar. 13, 2007

(65) Prior Publication Data

US 2008/0227926 A1 Sep. 18, 2008

(51) Int. Cl.
*C07F 7/18* (2006.01)

(52) U.S. Cl. .............. 556/422; 556/437; 556/411; 556/418; 556/419; 556/420; 556/438

(58) Field of Classification Search ............ 556/422, 556/437, 411, 418, 419, 420, 438
See application file for complete search history.

(56) References Cited

U.S. PATENT DOCUMENTS 7,091,281 B2   8/2006   Kageishi et al.

OTHER PUBLICATIONS

Klapdohr et al. {Monatshefte fuer Chemie, 137(5), 2006, pp. 667-679; abstract only}.*

U.S. Appl. No. 11/672,548, filed Feb. 8, 2007, entitled "Film-Forming Material Containing Phosphorous", pp. 1-52.

U.S. Appl. No. 11/672,552, filed Feb. 8, 2007, entitled "Crosslinker Containing Phosphorous", pp. 1-46.

U.S. Appl. No. 11/672,556, filed Feb. 8, 2007, entitled "Method of Producing Coating Compositions Containing Phosphorous", pp. 1-57.

* cited by examiner

*Primary Examiner*—Elvis O Price
(74) *Attorney, Agent, or Firm*—Harness, Dickey & Pierce, P.L.C.

(57) ABSTRACT

A crosslinker (i.e., a curing agent) for polymerizing a film-forming material. The crosslinker is an organic compound including at least two functional groups reactive with a film-forming material and at least one pendent group comprising a —Si(OR)$_3$ group, wherein each R is independently an alkyl group including from 1 to about 12 carbon atoms or an aryl group including substituted and unsubstituted phenyl and benzyl groups. Functional groups reactive with a film-forming materials include isocyanate, blocked isocyanate, uretdione, epoxide, hydroxyl, carboxyl, ester, ether, carbamate, aminoalkanol, aminoalkylether, amide, or amine groups. Embodiments include derivatives of the various crosslinkers as disclosed elsewhere herein, where the crosslinker has at least two functional groups reactive with a film-forming material and at least one pendent group comprising a —Si(OR)$_3$ group.

6 Claims, No Drawings

CROSSLINKERS CONTAINING SILANE

BACKGROUND

Coating compositions are used in a variety of applications to coat a variety of substrates, often for protection of the substrate or to improve adhesion of subsequent coating layers. Typical coatings include electrodeposition coatings, primers, sealers, basecoats, clearcoats, and one-coat topcoats. Coating compositions include film-forming materials containing one or more resins, which may be polymeric, oligomeric, and/or monomeric materials, that are applied to a substrate by various methods, including electrodeposition (or electrocoating), spray coating, dip coating, roll coating, knife coating, and curtain coating. As used herein, a "resin" refers to one or more polymeric, oligomeric, and/or monomeric materials; a polymer includes repeating monomer units; an oligomer is a polymer including a few repeating monomer units, typically ten or fewer. Various types of film-forming materials are known and include epoxy, acrylic, polyurethane, polycarbonate, polysiloxane, aminoplast, and polyester resins.

Coating compositions can include a pigment dispersing or grind resin and a principal resin that generally constitutes the major polymeric part of the coating film. A grind resin usually includes a film-forming material, with which a pigment paste is made by wetting out pigment, filler, and catalyst, such as a metal catalyst, where the grind resin is blended or mixed with the other materials by milling in, e.g., a sandmill, ball mill, attritor, or other equipment. The pigment paste is combined with the principal resin and, typically, a crosslinker; i.e., curing agent. The grind resin and the principal resin can include the same, different, or mixtures of various film-forming materials.

The relatively soft film of an applied coating composition can be hardened by curing or crosslinking the film through incorporation of a crosslinker in the coating composition. The crosslinker can be chemically reactive toward the polymers, oligomers, and/or monomeric compounds of the resin in the coating composition, thereby covalently joining the film-forming units together into a crosslinked film. Typical crosslinkers are activated (e.g., unblocked) using heat during a curing step and/or by exposure to actinic radiation. Catalysts, such as metal catalysts, can be used to facilitate thermal activation of the crosslinker and the reaction of the crosslinker with the resin. For example, inclusion of a catalyst such as a metal catalyst can reduce the requisite cure temperature and/or provide for a more complete cure.

Coating compositions can be powder based, organic solvent based, or aqueous based. However, it is often desirable to use aqueous based coatings in order to reduce organic emissions. Such aqueous coating compositions include emulsions and dispersions of cationic, anionic, or nonionic resins, which may be formed via the dispersive properties of the resins themselves or with aid of external surfactants.

Epoxy-based coatings include polymers, oligomers, and/or monomers prepared by reacting materials with epoxide groups with materials having functional groups such as carboxyl, hydroxyl, and amine groups. Epoxies can be cured or crosslinked to form hardened coatings by using various crosslinkers depending on the functional groups present. For example, hydroxy-functional resin can be cured using isocyanate compounds. Such coating compositions are known in the art; e.g., U.S. Pat. Nos. 6,852,824; 5,817,733; and 4,761,337.

The electrodeposition process can be anodic or cathodic; typically the article to be coated serves as the cathode. Electrodeposition processes are advantageous both economically and environmentally due to the high transfer efficiency of coating resin to the substrate and the low levels of organic solvent, if any, that are employed. Another advantage of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even and continuous coating layer formed over all portions of the metallic substrate provides maximum anticorrosion effectiveness.

Electrocoat baths can comprise an aqueous dispersion or emulsion of a film-forming material, such as an epoxy resin, having ionic stabilization. A dispersion is typically a two-phase system of one or more finely divided solids, liquids, or combinations thereof in a continuous liquid medium such as water or a mixture of water and organic cosolvent. An emulsion is a dispersion of liquid droplets in a liquid medium, preferably water or a mixture of water and various cosolvents. Accordingly, an emulsion is a type of dispersion.

For automotive or industrial applications, the electrocoat compositions are formulated to be curable compositions by including a crosslinker. During electrodeposition, a coating composition containing an ionically-charged resin is deposited onto a conductive substrate by submerging the substrate in an electrocoat bath having dispersed therein the charged resin and then applying an electrical potential between the substrate and a pole of opposite charge, for example, a stainless steel electrode. The charged coating particles are plated or deposited onto the conductive substrate. The coated substrate is then heated to cure the coating.

Typical substrates to be coated include metallic substrates, such as steel, galvanized and electrogalvanized metals, zinc alloys, and aluminum substrates. The substrate is often treated in a multi-step process in order to prepare the surface prior to application of the coating composition. Substrate preparation can include treatments with cleaners and conditioning rinses followed by phosphating (also known as phosphatizing or parkerizing) the substrate. For example, a steel substrate can be cleaned and conditioned to remove any metal working fluids or oils by spraying with or immersion in cleaners and conditioning rinses. The cleaned substrate is then treated with a zinc, manganese, and/or iron phosphate conversion coating by immersion. The phosphate coating serves to improve adhesion between the substrate and subsequent organic coatings, such as an epoxy-based electrocoating composition.

A significant amount of time and energy is involved in preparation of the coating composition, preparation of the substrate surface, and the application of the coating composition to the substrate. Elimination of one or more steps or combination of multiple steps in the coating process would be advantageous. Such changes could reduce the amount of equipment necessary in addition to saving time and energy.

A need, therefore, exists for film-forming materials and processes using film-forming materials that improve and simplify the coating process, for example, by reducing the number of steps involved and/or by combining steps.

SUMMARY

The present invention provides a film-forming material comprising a resin, wherein the resin includes at least one pendent group comprising a —$Si(OR)_3$ group, wherein each R is independently an alkyl group including from 1 to about 12 carbon atoms or an aryl group including substituted and unsubstituted phenyl and benzyl groups; and at least one crosslinkable group. The crosslinkable group can be reactive with a crosslinker, self condensing, reactive with another group on the resin, or addition polymerizable. In some embodiments, the group reactive with a crosslinker can be an epoxide, hydroxyl, carboxyl, carbamate, aminoalkanol, aminoalkylether, amide, or amine group. The resin can be any film-forming resin, such as an epoxy, acrylic, polyurethane, polycarbonate, polysiloxane, aminoplast, or polyester resin and can be a homopolymer or copolymer. In certain embodiments, the pendent group can be bonded to the resin via an ester linkage and in various embodiments the pendent group further comprises a carboxylic acid group.

Further embodiments include a crosslinker for polymerizing a film-forming material comprising an alkyl or aromatic compound including at least two functional groups reactive with a film-forming material and at least one pendent group comprising a —Si(OR)$_3$ group, wherein each R is independently an alkyl group including from 1 to about 12 carbon atoms or an aryl group including substituted and unsubstituted phenyl and benzyl groups. Functional groups reactive with a film-forming material include isocyanate, blocked isocyanate, uretdione, epoxide, hydroxyl, carboxyl, ester, ether, carbamate, aminoalkanol, aminoalkylether, amide, or amine groups.

In some embodiments, the film-forming material and/or the crosslinker can further comprise a metal or metal compound coordinated by the film-forming material and/or crosslinker. The metal or metal compound includes those selected from a group consisting of M, MO, M$_2$O$_3$, M(OH)$_n$, R$_x$MO, and combinations thereof; wherein, M is a metal selected from the group consisting of Al, Au, Bi, Ce, Cu, Fe, Pb, Sn, Sb, Ti, Y, Zn, and Zr; n is an integer satisfying the valency of M; R is an alkyl or aromatic group; and x is an integer from 1 to 6. In various embodiments, the metal or metal compound comprises a metal catalyst selected from a group consisting of dibutyltin oxide, dibutyltin dilaurate, zinc oxide, bismuth oxide, tin oxide, yttrium oxide, copper oxide, and combinations thereof.

In various other embodiments, the film-forming material is produced by a process comprising reacting a resin having at least one pendent hydroxyl group with a carboxylic anhydride having an ethylenically unsaturated group to form a grafted resin having an ester group, a carboxylic acid group, and an ethylenically unsaturated group, wherein the resin has at least one group reactive with a crosslinker. The ethylenically unsaturated group of the grafted resin is then reacted with a compound having the formula HSi(OR)$_3$, wherein each R is independently an alkyl group including from 1 to about 12 carbon atoms or an aryl group including substituted and unsubstituted phenyl and benzyl groups, thereby producing a film-forming material having at least one pendent group comprising a —Si(OR)$_3$ group.

In some embodiments, a method of producing a coating composition includes combining a film-forming material and a crosslinker, wherein the film-forming material comprises a resin having at least one pendent group comprising a —Si(OR)$_3$ group, wherein each R is independently an alkyl group including from 1 to about 12 carbon atoms or an aryl group including substituted and unsubstituted phenyl and benzyl groups; and at least one crosslinkable group. In other embodiments, a method of producing a coating composition includes forming a film-forming material by a process comprising: reacting a resin having at least one pendent hydroxyl group with a carboxylic anhydride having an ethylenically unsaturated group to form a grafted resin having an ester group, a carboxylic acid group, and an ethylenically unsaturated group, wherein the resin has at least one crosslinkable group; and reacting the ethylenically unsaturated group of the grafted resin with a compound having the formula HSi(OR)$_3$, wherein each R is independently an alkyl group including from 1 to about 12 carbon atoms or an aryl group including substituted and unsubstituted phenyl and benzyl groups; and combining a crosslinker and the film-forming material. Crosslinkers can include blocked polyisocyanate compounds, uretdione compounds, polyisocyanates and oligomers thereof, and combinations thereof.

In various other embodiments, methods of producing a coated substrate are provided. Methods include combining a crosslinker and a film-forming material, the film-forming material comprising a resin, wherein the resin includes at least one pendent group comprising a —Si(OR)$_3$ group, wherein each R is independently an alkyl group including from 1 to about 12 carbon atoms or an aryl group including substituted and unsubstituted phenyl and benzyl groups; and at least one crosslinkable group; and applying the coating composition to the substrate.

Some embodiments of producing a coated substrate include forming a film-forming material by a process comprising reacting a resin having at least one pendent hydroxyl group with a carboxylic anhydride having an ethylenically unsaturated group to form a grafted polymer having an ester group, a carboxylic acid group, and an ethylenically unsaturated group, where the resin has at least one group reactive with a crosslinker. The ethylenically unsaturated group of the grafted polymer is reacted with a compound having the formula HSi(OR)$_3$, wherein each R is independently an alkyl group including from 1 to about 12 carbon atoms or an aryl group including substituted and unsubstituted phenyl and benzyl groups. A coating composition is prepared comprising a crosslinker and the film-forming resin and the coating composition is applied to the substrate. Applying the various coating compositions can include electrodepositing the coating composition and in some embodiments the applied coating compositions are cured.

The present invention affords various benefits over conventional film-forming resins. Such benefits include integration of the metal binding characteristics of a phosphating treatment into the film-forming resin. Film-forming materials containing a resin having at least one pendent group comprising a —Si(OR)$_3$ group exhibit improved adhesion between the resultant coating and a metallic substrate. Such resins can be applied to an untreated metallic substrate surface, simplifying and/or eliminating pretreatment steps. For example, these coating compositions can be applied to a substrate without the need for first phosphating the substrate. The ability to forego the phosphating treatment saves considerable process time and energy and further saves considerable floor space required for phosphating immersion tanks and equipment.

The film-forming materials of the present invention can also coordinate metals and metal compounds via the —Si(OR)$_3$ group. Such metals include metallic substrates, metals on the surface of a substrate, and/or the coordination of metal catalysts. The film-forming materials can further include other metal coordinating groups, such as carboxylic acid groups, that can also serve to coordinate metals and metal compounds.

The film-forming materials comprising a resin containing at least one pendent group comprising a —Si(OR)$_3$ group can provide better adhesion to a metal substrate and/or better corrosion protection. Without wishing to be bound by theory, it is believed that one or more oxygen atoms covalently bonded to the silicon atom in the film-forming resins can interact with the metal substrate to enhance adhesion of the polymeric film thereto. Furthermore, coating compositions according to the present invention can be formulated such that some of the pendent groups and/or additional carboxylic acid groups can be coordinated with metal catalysts to enhance curing of the coating, while other pendent groups are free to interact with the metal substrate to enhance adhesion.

The ability to coordinate metal catalysts provides another advantage, in that metal catalysts can reduce the requisite cure temperature of the coating composition and/or provide for more complete curing. The film-forming material can be mixed with various amounts of metal catalysts to provide various amounts of resin-metal complexes using the carboxylic acid groups and/or pendent groups from the resin. For example, the present invention enables liquid organometallic salts to be added directly to the coating composition to form resin and metal catalyst complexes.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all values and further divided ranges within the entire range.

DETAILED DESCRIPTION

Further areas of applicability and advantages will become apparent from the following description. It should be understood that the description and specific examples, while exemplifying various embodiments of the invention, are intended for purposes of illustration and are not intended to limit the scope of the invention.

The present invention includes film-forming materials, crosslinkers, processes for producing film-forming materials, coating compositions, methods of producing coating compositions, and methods of producing coated substrates. Embodiments include at least one pendent group comprising a —Si(OR)$_3$ group, wherein each R is independently an alkyl group including from 1 to about 12 carbon atoms or an aryl group including substituted and unsubstituted phenyl and benzyl groups. One or more of the oxygen atoms covalently bonded to the silicon atom can coordinate metals and/or metal compounds, such as metal substrates and/or metal catalysts.

A film-forming material can comprise a resin, wherein the resin includes at least one pendent group comprising a —Si(OR)$_3$ group, wherein each R is independently an alkyl group including from 1 to about 12 carbon atoms or an aryl group including substituted and unsubstituted phenyl and benzyl groups. The resin also includes at least one crosslinkable group selected from a group reactive with a crosslinker, a self-condensing group, an addition polymerizable group, and a group curable with actinic radiation. The group reactive with a crosslinker can be an epoxide, hydroxyl, carboxyl, carbamate, or amine group.

In one embodiment, the film-forming material comprises a resin that includes at least one pendent group comprising a —Si(OR)$_3$ group, and at least one group reactive with a crosslinker. The resin can include one or more polymeric, oligomeric, and/or monomeric materials. The film-forming material can include various resins, such as epoxy, acrylic, polyurethane, polycarbonate, polysiloxane, polyvinyl, polyether, aminoplast, and polyester resins, and can include mixtures thereof. In embodiments where the resin is a polymer, it can be a homopolymer or a copolymer. Copolymers have two or more types of repeating units.

In some embodiments, the pendent group comprising a —Si(OR)$_3$ group is bonded to the resin via various linkages. The pendent group can be covalently attached to the resin by ester, amine, urethane, and ether bonds, among others. Exemplary reactions of functional groups to produce these linkages include: epoxide reacted with acid resulting in an ester linkage; epoxide reacted with amine resulting in an amine linkage; hydroxyl reacted with isocyanate resulting in a urethane linkage; hydroxyl reacted with anhydride resulting in an ester linkage; epoxide reacted with hydroxyl resulting in an ether linkage; and other types of linkages generally used in forming coating resins.

Pendent groups can comprise a —Si(OR)$_3$ group, wherein each R is independently an alkyl group including from 1 to about 12 carbon atoms or an aryl group including substituted and unsubstituted phenyl and benzyl groups. Exemplary pendent groups can comprise trimethoxysilane, triethoxysilane, tripropoxysilane, tributoxysilane, tripentoxysilane, trihexoxysilane, triheptoxysilane, trioctoxysilane, trinonoxysilane, tridecoxysilane, triundecoxysilane, tridodecoxysilane, triphenoxysilane, and tribenzoxysilane groups.

In various embodiments, the pendent group can be added to the resin using any one of several reactions. In one embodiment, a two-step process is used to prepare a film-forming material comprising a resin having at least one pendent group comprising a —Si(OR)$_3$ group. In the first step, a resin, having at least one hydroxyl group and at least one group reactive with a crosslinker, is reacted with a carboxylic anhydride having an ethylenically unsaturated group to form a grafted resin having an ester linkage to a group comprising a carboxylic acid group and the ethylenically unsaturated group. Exemplary carboxylic anhydrides include aconitic anhydride, chloromaleic anhydride, citraconic anhydride, ethylmaleic anhydride, itaconic anhydride, maleic anhydride, mellitic anhydride, methoxymaleic anhydride, phthalic anhydride, pyromellitic anhydride, trimellitic anhydride, hexahydrophthalic anhydride, or tetrahydrophthalic anhydride. In the second step, the unsaturated carbon-carbon bond of the ethylenically unsaturated group of the grafted resin is then reacted with a compound having the formula HSi(OR)$_3$, wherein each R is independently an alkyl group including from 1 to about 12 carbon atoms or an aryl group including substituted and unsubstituted phenyl and benzyl groups, to covalently link the silicon atom to the resin.

Exemplary compounds having the formula HSi(OR)$_3$ comprise trimethoxysilane, triethoxysilane, tripropoxysilane, tributoxysilane, tripentoxysilane, trihexoxysilane, triheptoxysilane, trioctoxysilane, trinonoxysilane, tridecoxysilane, In some embodiments, the film-forming material comprising a —Si(OR)$_3$ group can be formed, in part, by adapting the two-step grafting reactions as found in U.S. patent application Ser. No. 11/278,030 filed Mar. 30, 2006, which is herein incorporated by reference. These reactions include various resins that are reacted with various anhydrides. Various anhydrides include anhydrides having at least one ethylenically unsaturated group. The resin-anhydride reaction product having at least one ethylenically unsaturated group is reacted with any one or more of various compounds having the formula HSi(OR)$_3$.

In some embodiments, a film-forming material comprises an epoxy resin comprising formula (1):

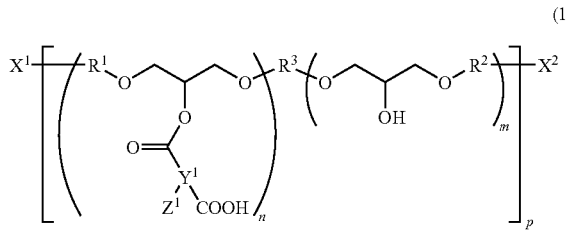

wherein, $X^1$ and $X^2$ are independently hydrogen, hydroxyl, epoxide, or amine functional monovalent radicals; each $R^1$, $R^2$, and $R^3$ is independently an organic divalent radical; each $Y^1$ is independently an organic trivalent radical having from 1 carbon atom to about 36 carbon atoms; each $Z^1$ is independently a monovalent radical comprising —Si(OR)$_3$, wherein each R is independently an alkyl group including from 1 to about 12 carbon atoms or an aryl group including substituted and unsubstituted phenyl and benzyl groups; n is an integer from 1 to about 12; m is an integer from 0 to about 12; and p is an integer from 1 to about 12.

In formula (1), the various values of m, n, and p correspond to resins having portions formed from various repeating monomer units. These values can be adjusted, for example, by varying the amounts and/or concentrations of capping, chain terminating, or chain propagation groups in the resin synthesis; where "capping" means a functional group on the resin is reacted with a functional group of another molecule, such as an amine, to covalently bond the molecule to the resin. Furthermore, resin synthesis can be performed in steps or in batch, and typically results in a mixed population of resin molecules having various values for n, m, and p. The organic divalent radicals denoted by each $R^1$, $R^2$, and $R^3$ can be derived from the same molecule or can be different molecules. Also, as shown in formula (1), when m is 0, there is no $R^2$ group as the portion bracketed by m is absent. In this case, $R^3$ is covalently bonded to $X^2$ In some embodiments, the organic divalent radicals denoted by $R^1$, $R^2$, and $R^3$ are 2,2-diphenylpropane divalent radicals. Furthermore, in cases where n>1, m>1, and/or p>1, two or more 2,2-diphenylpropylene radicals can be linked to each other. For example, in some embodiments, $R^1$, $R^2$, and/or $R^3$ of the resin can comprise part of the product formed by the reaction of diglycidyl ether of bisphenol A ("G") and bisphenol A ("B"), which results in repeats of the formula -G-B-. Embodiments further include permutations wherein n and p are integers from 1 to about 12 and m is an integer from 0 to about 12, resulting in repeating units such as -G-B-G-, -G-B-G-B-, -G-B-G-B-G-, and so on.

In some embodiments, $X^1$ and $X^2$ are independently hydrogen, hydroxyl, epoxide, or amine functional monovalent radicals. Embodiments of resins where $X^1$ and/or $X^2$ are amine monovalent radicals can include epoxy resins capped with an amine, where "capped" means a functional group on the resin, such as an epoxide group, is reacted with the amine-containing compound to covalently bond the amine to the resin. Exemplary capping compounds can include ammonia or amines such as dimethylethanolamine, aminomethylpropanol, methylethanolamine, diethanolamine, diethylethanolamine, dimethylaminopropylamine, the diketamine derivative of diethylenetriamine, and mixtures thereof. In various embodiments, for example, a cathodic electrocoating composition can be formed by salting the (capped) amine-containing resin with an acid and dispersing it in water. Exemplary capping compounds also include aminoorganotrialkoxysilanes as disclosed elsewhere in the present teachings.

It should be noted that in some embodiments, such as for example, liquid epoxy coating compositions, the overall molecular weight of the film-forming material will affect the liquid phase properties, such as the viscosity of the coating composition. Consequently, the molecular weight (and corresponding viscosity) of the resin can be adjusted as required by changing the number of repeating portions in the resin by varying the values of n, m, and p in the above formula. For example, film-forming materials can include from one to about twelve units denoted by both n and p and from zero to about twelve units denoted by m.

In some embodiments, the resin is a vinyl polymer, including an acrylic polymer. The acrylic polymer comprises a functional group which is a hydroxyl, amino, or epoxy group that is reactive with a curing agent (i.e., crosslinker). Acrylic polymers can be formed using methyl acrylate, acrylic acid, methacrylic acid, methyl methacrylate, butyl methacrylate, and cyclohexyl methacrylate. The functional group can be incorporated into the ester portion of the acrylic monomer. For example, hydroxyl-functional acrylic copolymers may be formed by polymerization using various acrylate and methacrylate monomers, including but not limited to, hydroxyethyl acrylate, hydroxybutyl acrylate, hydroxybutyl methacrylate, or hydroxypropyl acrylate; amino-functional acrylic copolymers may be formed by polymerization with t-butylaminoethyl methacrylate and t-butylaminoethylacrylate; and epoxy-functional acrylic copolymers may be formed by reaction with glycidyl acrylate, glycidyl methacrylate, or allyl glycidyl ether.

Other ethylenically unsaturated monomers that may be used in forming the acrylic copolymer having reactive functionality include esters or nitriles or amides of alpha-, beta-ethylenically unsaturated monocarboxylic acids containing from 3 to 5 carbon atoms; vinyl esters, vinyl ethers, vinyl ketones, vinyl amides, and vinyl compounds of aromatics and heterocycles. Representative examples further include acrylic and methacrylic acid amides and aminoalkyl amides; acrylonitrile and methacrylonitriles; esters of acrylic and methacrylic acid, including those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates; esters of fumaric, maleic, and itaconic acids, like maleic acid dimethyl ester and maleic acid monohexyl ester; vinyl acetate, vinyl propionate, vinyl ethyl ether, and vinyl ethyl ketone; styrene, α-methyl styrene, vinyl toluene, and 2-vinyl pyrrolidone.

Acrylic copolymers may be prepared by using conventional techniques, such as free radical polymerization, cationic polymerization, or anionic polymerization, in, for example, a batch, semi-batch, or continuous feed process. For instance, the polymerization may be carried out by heating the ethylenically unsaturated monomers in bulk or in solution in the presence of a free radical source, such as an organic peroxide or azo compound and, optionally, a chain transfer agent, in a batch or continuous feed reactor. Alternatively, the monomers and initiator(s) may be fed into the heated reactor at a controlled rate in a semi-batch process. Where the reaction is carried out in a solution polymerization process, the solvent should preferably be removed after the polymerization is completed. Preferably, the polymerization is carried out in the absence of any solvent.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cyclohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene. The free radical polymerization is usually carried out at temperatures from about 20° C. to about 250° C., preferably from 90° C. to 170° C. The reaction is carried out according to conventional methods to produce a solid acrylic copolymer.

Acrylic resins can have an equivalent weight (grams resin solid per mol equivalent —OH group) from about 150 to 950, including about 300 to about 600, and further including about 350 to about 550. The number average molecular weight (Mn) can be from about 5,000 to about 10,000 for high solids. A typical acrylic polymer is a hydroxy functional acrylic polyol. In some embodiments, an acrylic resin can be used to form an electrocoating composition. A cathodic electrocoating composition may be formed by copolymerizing an amine-functional ethyleneically unsaturated monomer. The amine is salted and dispersed in water.

In some embodiments, the resin is a polyester resin. Polyfunctional acid or anhydride compounds can be reacted with polyfunctional alcohols to form the polyester, and include alkyl, alkylene, arylalkylene, and aromatic compounds. Typical compounds include dicarboxylic acids and anhydrides; however, acids or anhydrides with higher functionality may also be used. If tri-functional compounds or compounds of higher functionality are used, these may be used in mixture with mono-functional carboxylic acids or anhydrides of monocarboxylic acids, such as versatic acid, fatty acids, or neodecanoic acid. Illustrative examples of acid or anhydride functional compounds suitable for forming the polyester groups or anhydrides of such compounds include phthalic acid, phthalic anhydride, isophthalic acid, terephthalic acid, hexahydrophthalic acid, tetrachlorophthalic anhydride, hexahydrophthalic anhydride, pyromellitic anhydride, succinic acid, azeleic acid, adipic acid, 1,4-cyclohexanedicarboxylic acid, citric acid, and trimellitic anhydride.

The polyol component used to make the polyester resin has a hydroxyl functionality of at least two. The polyol component may contain mono-, di-, and tri-functional alcohols, as well as alcohols of higher functionality. Diols are a typical polyol component. Alcohols with higher functionality may be used where some branching of the polyester is desired, and mixtures of diols and triols can be used as the polyol component. However, in some cases, highly branched polyesters are not desirable due to effects on the coating, such as decreased flow, and undesirable effects on the cured film, such as diminished chip resistance and smoothness.

Examples of useful polyols include, but are not limited to, ethylene glycol, diethylene glycol, triethylene glycol, propylene glycol, dipropylene glycol, butylene glycol, glycerine, trimethylolpropane, trimethylolethane, pentaerythritol, neopentyl glycol, 2,2,4-trimethyl-1,3-pentanediol, 1,6-hexanediol, 1,4-cyclohexane dimethanol, hydrogenated bisphenol A, and ethoxylated bisphenols.

Methods of making polyester resins are well-known. Polyesters are typically formed by heating together the polyol and poly-functional acid components, with or without catalysts, while removing the by-product of water in order to drive the reaction to completion. A small amount of a solvent, such as toluene, may be added in order to remove the water azeotropically. If added, such solvent is typically removed from the polyester product before the coating formulation is begun.

In some embodiments, the resin can be a polyurethane resin. Polyurethanes can be formed from two components, where the first includes compounds containing hydroxyl groups, which are at least difunctional for the purposes of the isocyanate-addition reaction. The second component includes at least one polyisocyanate compound.

The polyol component must be at least difunctional for the purpose of the polymerization reaction. These compounds generally have an average functionality of about two to eight, preferably about two to four. These compounds generally have a molecular weight of from about 60 to about 10,000, preferably from 400 to about 8,000. However, it is also possible to use low molecular weight compounds having molecular weights below 400. The only requirement is that the compounds used should not be volatile under the heating conditions, if any, used to cure the compositions.

Preferred macromonomer compounds containing isocyanate-reactive hydrogen atoms are the known polyester polyols, polyether polyols, polyhydroxy polyacrylates and polycarbonates containing hydroxyl groups. In addition to these polyhydroxy compounds, it is also possible to use polyhydroxy polyacetals, polyhydroxy polyester amides, polythioethers containing terminal hydroxyl groups or sulfhydryl groups or at least difunctional compounds containing amino groups, thiol groups or carboxyl groups. Mixtures of the compounds containing isocyanate-reactive hydrogen atoms may also be used. Other exemplary hydroxyl containing compounds can be found in U.S. Pat. No. 4,439,593 issued on Mar. 27, 1984, which is hereby incorporated by reference.

In various embodiments, a film-forming material comprises formula (2):

(2)

wherein, $R^4$ is a monovalent radical of a resin having from 2 to 12 monomer units or a film-forming resin of formula (1); $R^5$ is a monovalent radical of hydrogen, a resin having from 2 to 12 monomer units, or a film-forming resin of formula (1); and $Z^2$ is a monovalent radical comprising —$(CH_2)_n$—Si$(OR)_3$, wherein each R is independently an alkyl group including from 1 to about 12 carbon atoms or an aryl group including substituted and unsubstituted phenyl and benzyl groups, and n is an integer from 1 to about 12.

Film-forming materials according to formula (2) further include those where $R^4$ and/or $R^5$ are monovalent radicals of a resin, wherein the resin includes at least one pendent group comprising a —Si$(OR)_3$ group, wherein each R is independently an alkyl group including from 1 to about 12 carbon atoms or an aryl group including substituted and unsubstituted phenyl and benzyl groups; and at least one crosslinkable group.

In some embodiments, film-forming materials include a resin that is capped with an amine or aminoorganotrialkoxysilane; i.e., where a functional group on the resin is reacted with the amine-containing compound to covalently bond the amine to the resin. The resin can be any resin as described, such as a resin including at least one pendent group comprising a —Si$(OR)_3$ group, wherein each R is independently an alkyl group including from 1 to about 12 carbon atoms or an aryl group including substituted and unsubstituted phenyl and benzyl groups, and at least one group reactive with a crosslinker. In some embodiments, amines and/or aminoorganotrialkoxysilanes can be used to cap a resin where the resin has at least one terminal epoxide group. Other resins can be capped, including resins not having a —Si(OR)$_3$ group, such as for example where R$^4$ and R$^5$ in formula (2) do not have a —Si(OR)$_3$ group. These include epoxy, acrylic, polyurethane, polycarbonate, polysiloxane, aminoplast, or polyester resins. Further embodiments include capping resins of formulas (1) and (2) with amines and/or aminoorganotrialkoxysilanes.

Suitable aminoorganotrialkoxysilanes for capping various resins include H$_2$N—(CH$_2$)$_n$—Si(OR)$_3$, wherein each R is independently an alkyl group including from 1 to about 12 carbon atoms or an aryl group including substituted and unsubstituted phenyl and benzyl groups, and n is an integer from 1 to about 12. Exemplary aminoorganotrialkoxysilanes include: beta-aminoethyltrimethoxysilane, beta-aminoethyltriethoxysilane, beta-aminoethyltributoxysilane, beta-aminoethyltripropoxysilane, alpha-aminoethyltrimethoxysilane, alpha-aminoethyltriethoxysilane, gamma-aminopropyltrimethoxysilane, gamma-aminopropyltriethoxysilane, gamma-aminopropyltributoxysilane, gamma-aminopropyltripropoxysilane, beta-aminopropyltrimethoxysilane, beta-aminopropyltriethoxysilane, beta-aminopropyltripropoxysilane, beta-aminopropyltributoxysilane, alpha-aminopropyltrimethoxysilane, alpha-aminopropyltriethoxysilane, alpha-aminopropyltributoxysilane, alpha-aminopropyltripropoxysilane, N-aminomethylaminoethyltrimethoxysilane, N-aminomethylaminomethyltripropoxysilane, N-aminomethyl-beta-aminoethyltrimethoxysilane, N-aminomethyl-beta-aminoethyltriethoxysilane, N-aminoethyl-beta-aminoethyltripropoxysilane, N-aminomethyl-gamma-aminopropyltrimethoxysilane, N-aminomethyl-gamma-aminopropytriethoxysilane, N-aminomethyl-gamma-aminopropyltripropoxysilane, N-aminomethyl-beta-aminopropyltrimethoxysilane, N-aminomethyl-beta-aminopropyltriethoxysilane, N-aminomethyl-beta-aminopropyltripropoxysilane, N-aminopropyltripropoxysilane, N-aminopropyltrimethoxysilane, N-(beta-aminoethyl)-beta-aminoethyltrimethoxysilane, N-(beta-aminoethyl)-beta-aminoethyltriethoxysilane, N-(beta-aminoethyl)-beta-aminoethyltripropoxysilane, N-(beta-aminoethyl)-beta-aminoethyltrimethoxysilane, N-(beta-aminoethyl)-alpha-aminoethyltriethoxysilane, N-(beta-aminoethyl)-alpha-aminoethyltripropoxysilane, N-(beta-aminoethyl)-beta-aminopropyltrimethoxysilane, N-(beta-aminoethyl)-gamma-aminopropyltriethoxysilane, N-(beta-aminoethyl)-gamma-aminopropyltripropoxysilane, N-(beta-aminoethyl)-gamma-aminopropyltrimethoxysilane, N-(beta-aminoethyl)-beta-aminopropyltriethoxysilane, N-(beta-aminoethyl)-beta-aminopropyltripropoxysilane, N-(gamma-aminopropyl)-beta-aminoethyltrimethoxysilane, N-(gamma-aminopropyl)-beta-aminoethyltriethoxysilane, N-(gam ma-aminopropyl)-beta-aminoethyltripropoxysilane, N-methylaminopropyltrimethoxysilane, beta-aminopropylmethyldiethoxysilane, gamma-diethylenetriaminopropyltriethoxysilane, ureidopropyltrimethyloxysilane, and N-phenyl-3-aminopropyltriethoxysilane.

In some embodiments, the film-forming material can include a mixed population of resin molecules. For example, the various reactions described can result in film-forming material products consisting of fractions of various film-forming materials with different numbers of repeating monomer units. These film-forming materials can result from variations in the rate of propagation and termination events in the reaction used to form the resin and/or by adding various reactants in stages.

In some embodiments, the film-forming material further comprises one or more metals or metal containing compounds that are coordinated by the resin. The resin can coordinate the metal or metal containing compound via the pendent group comprising the —Si(OR)$_3$ group. In various embodiments, the pendent group can further comprise a carboxylic acid group, allowing metal or metal compounds to be coordinated by the —Si(OR)$_3$ group and/or the carboxylic acid group. One or more oxygen atoms covalently bonded to the silicon atom can coordinate the metal or metal compound. The carboxylic acid group can likewise coordinate a metal or metal compound via an oxygen atom. Metal coordination by film-forming materials is also described in U.S. patent application Ser. Nos. 11/553,185; 11/553,195; 11/553,213 filed Oct. 26, 2006; and Ser. No. 11/278,030 filed Mar. 30, 2006; which are herein incorporated by reference.

Film-forming materials can therefore coordinate one or more metals or metal compounds, including metal substrates and/or metal catalysts that improve the cure response of the film-forming material when used in a coating composition. Metals and metal compounds can include those selected from a group consisting of M, MO, M$_2$O$_3$, M(OH)$_n$, R$_x$MO, and combinations thereof; wherein, n is an integer satisfying the valency of M; R is an alkyl or aromatic group; and x is an integer from 1 to 6. In some preferred embodiments, M is selected from the group consisting of Al, Au, Bi, Ce, Cu, Fe, Pb, Sn, Sb, Ti, Y, Zn, and Zr. Exemplary metal catalysts can include dibutyl tin oxide, dibutyl tin dilaurate, zinc oxide, bismuth oxide, tin oxide, yttrium oxide, copper oxide, and combinations thereof.

A coating composition according to the invention contains a film forming material as described above, or other suitable film forming material and a crosslinker (i.e., a curing agent) for polymerizing a film-forming material. The crosslinker comprises an organic compound including at least two functional groups reactive with a film-forming material and at least one pendent group comprising a —Si(OR)$_3$ group, wherein each R is independently an alkyl group including from 1 to about 12 carbon atoms or an aryl group including substituted and unsubstituted phenyl and benzyl groups. Functional groups reactive with a film-forming resin include isocyanate, blocked isocyanate, uretdione, epoxide, hydroxyl, carboxyl, ester, ether, carbamate, aminoalkanol, aminoalkylether, amide, or amine groups. Embodiments include derivatives of the various crosslinkers as disclosed elsewhere herein, where the crosslinker has at least two functional groups reactive with a film-forming material and at least one pendent group comprising a —Si(OR)$_3$ group.

In various embodiments, the pendent group of the crosslinker may comprise the various pendent groups as described for a film-forming material of the present teachings. In some embodiments, the crosslinker can also coordinate a metal or metal compound via the pendent group.

In some embodiments, a crosslinker for polymerizing a film-forming material comprises formula (3):

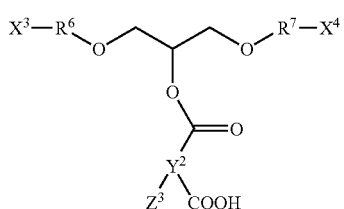

wherein, $X^3$ and $X^4$ are independently hydroxyl, epoxide, isocyanate, blocked isocyanate, or amine functional monovalent radicals; $R^6$ and $R^7$ are independently organic divalent radicals; $Y^2$ is an organic trivalent radical having from 1 carbon atom to about 36 carbon atoms; and $Z^3$ is a monovalent radical comprising —$Si(OR)_3$, wherein each R is independently an alkyl group including from 1 to about 12 carbon atoms or an aryl group including substituted and unsubstituted phenyl and benzyl groups.

In some embodiments, a crosslinker includes a compound of formula (3) wherein $R^6$ and $R^7$ are 2,2-diphenylpropane divalent radicals.

In addition, various embodiments of the present crosslinkers can be mixed with various embodiments of the present film-forming materials and/or with other film forming materials or resins to form coating compositions which can be used to coat substrates. For example, a method of producing a coated substrate comprises applying a coating composition comprising a crosslinker and a film-forming material, wherein one or both of the crosslinker and the film-forming material includes a pendent group comprising a —$Si(OR)_3$ group, wherein each R is independently an alkyl group including from 1 to about 12 carbon atoms or an aryl group including substituted and unsubstituted phenyl and benzyl groups. The coating composition may be cured on the substrate.

Upon curing the present coating compositions, the resulting cured film includes the pendent group comprising a —$Si(OR)_3$ group, the silicon atom having three covalently bonded oxygen atoms, wherein one or more of the oxygen atoms can coordinate a metal or metal compound. The pendent groups may be used to improve adhesion to and/or protection of a metal substrate. In some embodiments, the crosslinkers comprising pendent groups can be complexed with one or more metal catalysts prior to forming the coating composition or the metal catalyst can be added after the crosslinker is combined with the film-forming material.

The present invention provides various ways of producing a film-forming material. In one embodiment, a film-forming material is produced by a process comprising reacting a resin having at least one pendent hydroxyl group with a carboxylic anhydride having an ethylenically unsaturated group to form a grafted resin having an ester group, a carboxylic acid group, and an ethylenically unsaturated group, wherein the resin has at least one group reactive with a crosslinker; and reacting the ethylenically unsaturated group of the grafted resin with a compound having the formula $HSi(OR)_3$, wherein each R is independently an alkyl group including from 1 to about 12 carbon atoms or an aryl group including substituted and unsubstituted phenyl and benzyl groups.

The process of producing a film-forming material can further include other reactants, such as capping agents, chain propagating or chain terminating agents, metals and metal compounds, and combinations thereof. Exemplary molecules include bisphenol A, bisphenol F, diols, amines, phenol, and metals and metal compounds, including metal catalysts.

The amount of pendent groups comprising a —$Si(OR)_3$ group incorporated into the resin can be varied and optimized for specific performance characteristics. In some embodiments, it is not necessary incorporate the pendent groups throughout the backbone of the film-forming material and/or have the majority of crosslinker molecules include the pendent groups. In fact, in some embodiments, most of the polymer backbone and/or crosslinker molecules do not contain pendent groups comprising a —$Si(OR)_3$ group. The amount of pendent groups can be adjusted to provide enough pendent groups comprising a —$Si(OR)_3$ group, in order to coordinate a metal and/or metal compound so that desired adhesion characteristics are realized and/or sufficient cure and/or coating stability results. For example, in the case of an epoxy-based resin, from about 5% to about 15% of pendent hydroxyl groups can be reacted with a carboxylic anhydride having an ethyleneically unsaturated group and subsequently reacted with a compound having the formula $HSi(OR)_3$ to produce a film-forming material.

Coating compositions of the present invention include the film-forming materials and/or crosslinkers as described. Methods of coating substrates include application of coating compositions having these film-forming materials and/or crosslinkers. Coated substrates have coatings prepared from such coating compositions. Coating compositions can be produced using epoxide, acrylic, polyurethane, polycarbonate, polysiloxane, aminoplast, and/or polyester resins, for example. These various resins can be formed by reactions of appropriate functional groups, as is known in the art, to produce the resin bond linkages. Such reactions include: epoxide reacted with acid resulting in an ester linkage; epoxide reacted with amine resulting in an amine linkage; hydroxyl reacted with isocyanate resulting in a urethane linkage; hydroxyl reacted with anhydride resulting in an ester linkage; epoxide reacted with hydroxyl resulting in an ether linkage; and other types of linkages generally used in forming coating resins. The resulting film-forming resin contains a crosslinkable group, which can be a group reactive with a crosslinker, a self-condensing group, an addition polymerizable group, or a group curable with actinic radiation. Exemplary functional groups reactive with the film-forming resin include isocyanate, blocked isocyanate, uretdione, epoxide, hydroxyl, carboxyl, ester, ether, carbamate, aminoalkanol, aminoalkylether, amide, aminoalkyl ethers, or amine groups.

In some embodiments, the film-forming material can comprise a vinyl or acrylic resin, wherein the vinyl resin has at least one pendent group comprising a —$Si(OR)_3$ group, wherein each R is independently an alkyl group including from 1 to about 12 carbon atoms or an aryl group including substituted and unsubstituted phenyl and benzyl groups, and at least one group reactive with a crosslinker. The vinyl resin can be formed by polymerizing a compound having an unsaturated carbon bond and a pendent group comprising a —$Si(OR)_3$ group. Suitable compounds for incorporation during addition polymerization include the following: 4-allyl-1,2-dimethoxybenzene; 2-allyl-2-methyl-1,3-cyclopentanedione; 2-allyloxytetrahydropyran; allylphenyl carbonate; 3-allylrhodanine; allyltrimethoxysilane; itaconic anhydride; maleic anhydride; and combinations thereof.

In various embodiments of producing a coating composition, the film-forming materials of the present invention can be the sole film-forming resin, form a population of resins, or can be combined with additional resins. The film-forming materials can be used as a grind resin, principal resin, and/or crosslinker. The same resin can be used in preparing a pigment dispersion and the principal resin, or mixtures of various resins can be used to form a coating composition. In a pigmented composition, the grind resin and the principal resin can be combined in forming a coating composition containing film-forming material(s) according to the present invention.

Additional resins can be included with the film-forming materials of the present invention. For example, suitable additional resins include epoxy oligomers and polymers, such as polymers and oligomers of polyglycidyl ethers of polyhydric phenols such as bisphenol A. These can be produced by etherification of a polyphenol with an epihalohydrin or dihalohydrin such as epichlorohydrin or dichlorohydrin in the presence of alkali. Suitable polyhydric phenols include bis-2,2-(4-hydroxyphenyl)propane, bis-1,1-(4-hydroxyphenyl) ethane, bis(2-hydroxynaphthyl)methane and the like. The polyglycidyl ethers and polyhydric phenols can be condensed together to form the oligomers or polymers. Other useful poly-functional epoxide compounds are those made from novolak resins or similar poly-hydroxyphenol resins. Also suitable are polyglycidyl ethers of polyhydric alcohols such as ethylene glycol, propylene glycol, diethylene glycol and triethylene glycol. Also useful are polyglycidyl esters of polycarboxylic acids which are produced by the reaction of epichlorohydrin or a similar epoxy compound with an aliphatic or aromatic polycarboxylic acid such as succinic acid or terepthalic acid.

In some embodiments, an additional resin includes a liquid epoxy that is the reaction product of diglycidyl ether of bisphenol A and bisphenol A. Examples include modified upgraded epoxy resins having epoxy equivalent weights of approximately 100 to 1200 or more. Suitable liquid epoxies are GY2600, commercially available from Huntsman, and Epon® 828, commercially available from Hexion Specialty Chemicals, Inc. For example, epoxy-containing compounds can be reacted with hydroxyl-containing compounds, such as bisphenol A, ethoxylated bisphenol A, phenol, polyols, or substituted polyols.

In various embodiments, coating compositions can also include a mixture of resin compounds with groups reactive with a crosslinker (i.e., curing agent). The mixture of compounds can include more than one type of resin with groups reactive with a crosslinker, a resin mixture with one or more co-monomers, and more than one resin with at least one co-monomer.

In some embodiments, the present invention also includes incorporating a metal or a metal compound with the film-forming material to complex the metal or metal compound with the resin. Without wishing to be bound by theory, one or more electron-rich oxygen atoms, such as an oxygen atom bound to a silicon atom or an oxygen atom bound to a carbon atom (e.g., an oxygen atom in a carboxylic acid group) may coordinate a metal or metal compound through monodentate or polydentate geometries. Thus, the film-forming materials and associated metal(s) can form an associated complex. Metals include the various metals, metal compounds, and metal catalysts already mentioned. The metal can be added to the film-forming material, crosslinker, or to both the film-forming material and crosslinker, for example. In some embodiments, the metal catalyst is incorporated in a coating composition prior to curing the resin and crosslinker to form a cured coating. Alternatively, the metal catalyst can be incorporated with the film-forming material as a subpart of a coating composition; for example, the metal catalyst can be added to a film-forming material used as a grind resin.

A metal catalyst can also be incorporated at other various steps in producing the film-forming material. In some embodiments, the metal catalyst is incorporated in the step of forming the film-forming material, i.e., as the film-forming material is formed by the various reactions and mixtures described herein. Alternatively, the metal catalyst can be incorporated with the film-forming material after the resin is formed and prior to the reaction of the resin and the crosslinker to form the cured coating. For instance, in some embodiments, a pigment-containing composition may be incorporated prior to the step of reacting (i.e., curing) the resin and the crosslinker. Coating compositions commonly incorporate such pigment-containing compositions. The metal catalyst can be incorporated into the pigment-containing composition to complex the metal catalyst with the film-forming material.

Embodiments can include one metal catalyst, or in some embodiments, a combination of metal catalysts can be employed. The metal catalysts, such as for example, various metal oxides, can be supplied in a milled form having a low particle size (e.g., less than 20 microns, more typically less than 10 microns) such that no additional grinding is needed to reduce the particle size of the metal catalyst for effective incorporation of the metal catalyst with the film-forming material and/or crosslinker.

Various coating compositions include polyisocyanate crosslinkers capable of reacting with the film-forming material. Polyisocyanate crosslinkers can comprise any desired organic polyisocyanate having free isocyanate groups attached to aliphatic, cycloaliphatic, araliphatic and/or aromatic structures. Polyisocyanates can have from 2 to 5 isocyanate groups per molecule. Exemplary isocyanates are described in "Methoden der organischen Chemie" [Methods of Organic Chemistry], Houben-Weyl, volume 14/2, 4th Edition, Georg Thieme Verlag, Stuttgart 1963, pages 61 to 70, and by W. Siefken, Liebigs Ann. Chem. 562, 75 to 136. Suitable examples include 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, omega,omega'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate (isophorone diisocyanate), 2,5- and 3,5-bis(isocyanatomethyl)-8-methyl-1,4-methanodecahydronaphthalene, 1,5-, 2,5-, 1,6- and 2,6-bis(isocyanatomethyl)-4,7-methanohexahydroindane, 1,5-, 2,5-, 1,6- and 2,6-bis(isocyanato)-4,7-methylhexahydroindane, dicyclohexyl2,4'- and 4,4'-diisocyanate, 2,4- and 2,6-hexahydrotolylene diisocyanate, perhydro 2,4'- and 4,4'-diphenylmethane diisocyanate, omega,omega'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, naphthylene-1, 5-diisocyanate, tolylene diisocyanates, such as 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, but also triisocyanates, such as 2,4,4'-triisocyanatodiphenyl ether, 4,4',4"-triisocyanatotriphenyl methane. Polyisocyanates can also contain isocyanurate groups and/or biuret groups and/or allophanate groups and/or urethane groups and/or urea groups. Polyisocyanates containing urethane groups, for example, are obtained by reacting some of the isocyanate groups with polyols, for example trimethylol propane and glycerol. Examples of suitable crosslinkers include: unblocked and blocked polyisocyanate compounds such as self-blocking uretdione compounds; caprolactam- and oxime-blocked polyisocyanates; isocyanurates of diisocyanates; diisocyanates half-blocked with polyols; and combinations thereof.

Polyisocyanate crosslinkers can further include polymeric MDI, an oligomer of 4,4'-diphenylmethane diisocyanate, or other polyisocyanate that is blocked with an ethylene glycol ether or a propylene glycol ether. Such crosslinkers containing urethane groups can be prepared, for example, from Lupranate® M20S, or other similar commercially available materials. Polyisocyanate compounds are commercially available from, among others, BASF AG, Degussa AG, and Bayer Polymers, LLC.

In some embodiments, thermal curing can include the reaction between isocyanate (free or blocked) with an active hydrogen functional group such as a hydroxyl or a primary or secondary amine; or that between an aminoplast and an active hydrogen material such as a carbamate, urea, amide or hydroxyl group; an epoxy with an active hydrogen material such as an acid, phenol, or amine; a cyclic carbonate with an active hydrogen material such as a primary or secondary amine; a silane (i.e., Si—O—R where R=H, an alkyl or aromatic group, or an ester) with an active hydrogen material, including when the active hydrogen material is Si—OH, as well as mixtures of these crosslinking pairs.

In various embodiments, methods of producing a coating composition can further comprise forming a salting site on the film-forming material. The film-forming materials can be further reacted with an amine containing compound, such as methylaminoethanol, diethanol amine, or the diketamine derivative of diethylenetriamine, to provide a salting site on the resin for use in cathodic electrocoating. Alternatively, quaternium ammonium, sulfonium, or phosphonium sites can be incorporated. Or, the film-forming materials can be reacted with an acid functionality in order to make anodic electrocoating compositions or anionic aqueous coating compositions.

These salting sites are then reacted, or salted, in forming an aqueous dispersion in forming electrodepositable or other aqueous coating compositions, for example. The film-forming material can have basic groups salted with an acid for use in a cathodic electrocoating composition. This reaction may be termed neutralization or acid-salting and specifically refers to the reaction of pendent amino or quarternary groups with an acidic compound in an amount sufficient to neutralize enough of the basic amino groups to impart water-dispersibility to the resin. Illustrative acid compounds can include phosphoric acid, propionic acid, acetic acid, lactic acid, formic acid, sulfamic acid, alkylsulfonic acids, and citric acid. Or, an acidic resin can be salted with a base to make an anodic electrocoating composition. For example, ammonia or amines such as dimethylethanolamine, triethylamine, aminomethylpropanol, methylethanolamine, and diethanolamine can be used to form an anodic electrocoating composition.

In some embodiments, coating compositions can also include at least one additive. Many types of additives are known to be useful in coating compositions, including electrocoating compositions. Such additives can include various organic solvents, surfactants, dispersants, additives to increase or reduce gloss, catalysts, pigments, fillers, and salting agents. Additional additives further include hindered amine light stabilizers, ultraviolet light absorbers, anti-oxidants, stabilizers, wetting agents, rheology control agents, adhesion promoters, and plasticizers. Such additives are well-known and may be included in amounts typically used for coating compositions.

In some embodiments, the film-forming materials can be used in methods of producing aqueous coating compositions. The aqueous medium of a coating composition is generally predominantly water, but a minor amount of organic solvent can be used. Examples of useful solvents include, without limitation, ethylene glycol butyl ether, propylene glycol phenyl ether, propylene glycol propyl ether, propylene glycol butyl ether, diethylene glycol butyl ether, dipropylene glycol methyl ether, propylene glycol monomethyl ether acetate, xylene, N-methylpyrrolidone, methyl isobutyl ketone, mineral spirits, butanol, butyl acetate, tributyl phosphate, dibutyl phthalate, and so on. However, organic solvent can be avoided to minimize organic volatile emissions from the coating process.

Examples of suitable surfactants include, without limitation, the dimethylethanolamine salt of dodecylbenzene sulfonic acid, sodium dioctylsulfosuccinate, ethoxylated nonylphenol, sodium dodecylbenzene sulfonate, the Surfynol® series of surfactants (Air Products and Chemicals, Inc.), and Amine-C (Huntsman Corp.). Generally, both ionic and nonionic surfactants may be used together, and, for example, the amount of surfactant in an electrocoat composition may be from 0 to 2%, based on the total solids. Choice of surfactant can also depend on the coating method. For example, an ionic surfactant should be compatible with the particular electrocoating composition, whether it is cathodic or anodic.

When the coating composition is a primer composition or pigmented topcoat composition, such as a basecoat composition, one or more pigments and/or fillers may be included. Pigments and fillers may be utilized in amounts typically of up to about 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Coating compositions formed according to the methods described can be coated on a substrate by any of a number of techniques well-known in the art. These can include, for example, spray coating, dip coating, roll coating, curtain coating, knife coating, coil coating, and the like. In some embodiments, the coating composition of the invention can be electrodepositable and can be coated onto the substrate by electrodeposition. The electrodeposited or applied coating layer can be cured on the substrate by reaction of the resin and crosslinker.

The coating composition can be electrodeposited as is conventionally performed in the art. Electrodeposition includes immersing an electrically conductive article in an electrocoating bath containing a coating composition of the present teachings, connecting the article as the cathode or anode, preferably as the cathode, depositing a coating composition film on the article using direct current, removing the coated article from the electrocoating bath, and subjecting the deposited electrocoated material film to conventional thermal curing, such as baking.

Coating compositions of the present invention are also useful as coil coatings. Coil coatings are applied to coiled sheet metal stock, such as steel or aluminum, in an economical, high speed process. The coil coating process results in a high quality, uniform coating with little waste of the coating and little generation of organic emissions as compared to other coating methods, e.g. spray application.

Polyester resins can be used as coil coating compositions and can comprise a branched polyester and/or an essentially linear polyester and a crosslinker. A pendent group comprising a —Si(OR)$_3$ group, wherein each R is independently an alkyl group including from 1 to about 12 carbon atoms or an aryl group including substituted and unsubstituted phenyl and benzyl groups, can be incorporated into the polyester and/or the crosslinker. The branched polyester can be prepared by condensation of a polyol component and a polyacid component, either of which can further include the pendant group or be reactive with a compound comprising the pendent group. The polyester synthesis may be carried out under suitable, well-known conditions, for example at temperatures from about 150° C. to about 250° C., with or without catalyst (e.g., dibutyl tin oxide, tin chloride, butyl chlorotin dihydroxide, or tetrabutyoxytitanate), typically with removal of the by-product water (e.g., by simple distillation, azeotropic distillation, vacuum distillation) to drive the reaction to completion. The crosslinker can have groups reactive with the hydroxyl functionality of the polyesters. Suitable crosslinkers include, without limitation, aminoplasts and isocyanate crosslinking agents. The coil coating composition typically further includes a pigment and can contain other additives and fillers.

Coil coating is a continuous feeding operation, with the end of one coil typically being joined (e.g., stapled) to the beginning of another coil. The coil is first fed into an accumulator tower and coating is fed into an exit accumulator tower, with the accumulator towers allowing the coating operation to continue at constant speed even when intake of the coil is delayed. For example, coil advancement can be delayed to start a new roll, or for winding of the steel, for example, to cut the steel to end one roll and begin a new roll. The coil is generally cleaned to remove oil or debris, pre-treated, primed with a primer on both sides, baked to cure the primer, quenched to cool the metal, and then coated on at least one side with a topcoat. A separate backer or a different topcoat may be applied on the other side. The topcoat is baked and quenched, then fed into the exit accumulator tower and from there is re-rolled.

The coating compositions can be applied onto many different substrates, including metal substrates such as bare steel, phosphated steel, galvanized steel, gold, or aluminum; and non-metallic substrates, such as plastics and composites including an electrically conductive organic layer. In electrocoating (e.g., electrodeposition) or electrospray, only electrically conductive substrates are used. The substrate may also be any of these materials having upon it already a layer of another coating, such as a layer of an electrodeposited primer, primer surfacer, and/or basecoat, either cured or uncured. When the substrate is metallic, the film-forming material with a pendent group comprising a —Si(OR)$_3$ group can act to improve film adhesion to the substrate.

Although various methods of curing may be used, in some embodiments, thermal curing can be used. Generally, thermal curing is effected by heating at a temperature and for a length of time sufficient to cause the reactants (i.e., the film-forming material and crosslinker) to form an insoluble polymeric network. The cure temperature can be from about 150° C. to about 200° C. for electrocoating compositions, and the length of cure can be about 15 minutes to about 60 minutes. Cure temperatures can be lower, for example, and in some embodiments can be reduced to 140° C. or lower due to metal catalysts complexed to the pendent groups in the film-forming materials. Therefore, lower bake temperatures can be used in some instances. For topcoats, the cure temperature can be from about 120° C. to about 140° C. and the cure time can be about 15 minutes to about 30 minutes. Heating can be done in infrared and/or convection ovens.

A coil coating composition cures at a given peak metal temperature. The peak metal temperature can be reached more quickly if the oven temperature is high. Oven temperatures for coil coating generally range from about 220° C. to about 500° C., to obtain peak metal temperatures of between 180° C. and about 250° C., for dwell times generally ranging from about 15 seconds to about 80 seconds. Oven temperatures, peak metal temperature and dwell times are adjusted according to the coating composition, substrate, and level of cure desired. Examples of coil coating methods are disclosed in U.S. Pat. Nos. 6,897,265; 5,380,816; 4,968,775; and 4,734,467, which are incorporated herein by reference.

The film-forming materials, crosslinkers, coating compositions, and methods of the present invention provide several advantages. For example, pretreatment of metal surfaces, such as phosphating, can be eliminated due to increased adhesion and corrosion performance of coating compositions made according to present teachings. Increased adhesion can be due to complexes forming between the pendent groups incorporated in the film-forming material (and/or crosslinker) and the metal substrate. Elimination of the phosphating step in coating a steel substrate can save time and expense. Furthermore, complexing metal catalysts with the film-forming material can improve cure response and catalytic efficiency of the applied coating composition. These improvements can be effected by the proximity of the metal catalyst to the reactive functional groups in the crosslinking matrix.

The present technology is further described in the following example. The example is merely illustrative and does not in any way limit the scope of the technology as described and claimed. All parts given are parts by weight unless otherwise noted. Tradename compounds suitable for practicing embodiments of the technology may be included, where applicable.

EXAMPLE 1

Synthesis of a Film-Forming Resin Containing Silane

A film-forming resin, having at least one pendent group comprising a —Si(OR)$_3$ group, is formed using a four step process. The first step is the backbone synthesis of the resin polymer. Diglycidyl ether of bisphenol A, bisphenol A, solvent, phenol, and catalyst are combined and reacted to produce a hydroxy polymer with monomer unit linkages containing a hydroxyl group flanked by ethers. The second step is amine capping by reacting the hydroxy polymer with primary or secondary amines, including aminoorganotrialkoxysilanes to incorporate —Si(OR)$_3$ groups. The third step involves a graft reaction between the capped hydroxy polymer and a carboxylic anhydride, where the carboxylic anhydride has an ethylenically unsaturated group. The carboxylic anhydride reacts with the hydroxyl group of the polymer producing an ester linkage between the former anhydride and the polymer. The grafted polymer product includes a carboxylic acid group and the ethylenically unsaturated group. The fourth step is reaction of the ethylenically unsaturated nucleophile with a compound having the formula $HSi(OR)_3$, wherein each R is independently an alkyl group including from 1 to about 12 carbon atoms or an aryl group including substituted and unsubstituted phenyl and benzyl groups.

The film-forming resin containing $-Si(OR)_3$ groups coordinates metals via one or more oxygen atoms covalently bonded to the silicon atom and/or the carboxylic acid groups. Metal coordination includes metals from a substrate surface, when the resin is applied as a coating film, and metals and metal compounds in the form of metal catalysts added to the coating composition to enhance cure properties of the coating film.

The synthesis scheme is illustrated as follows:

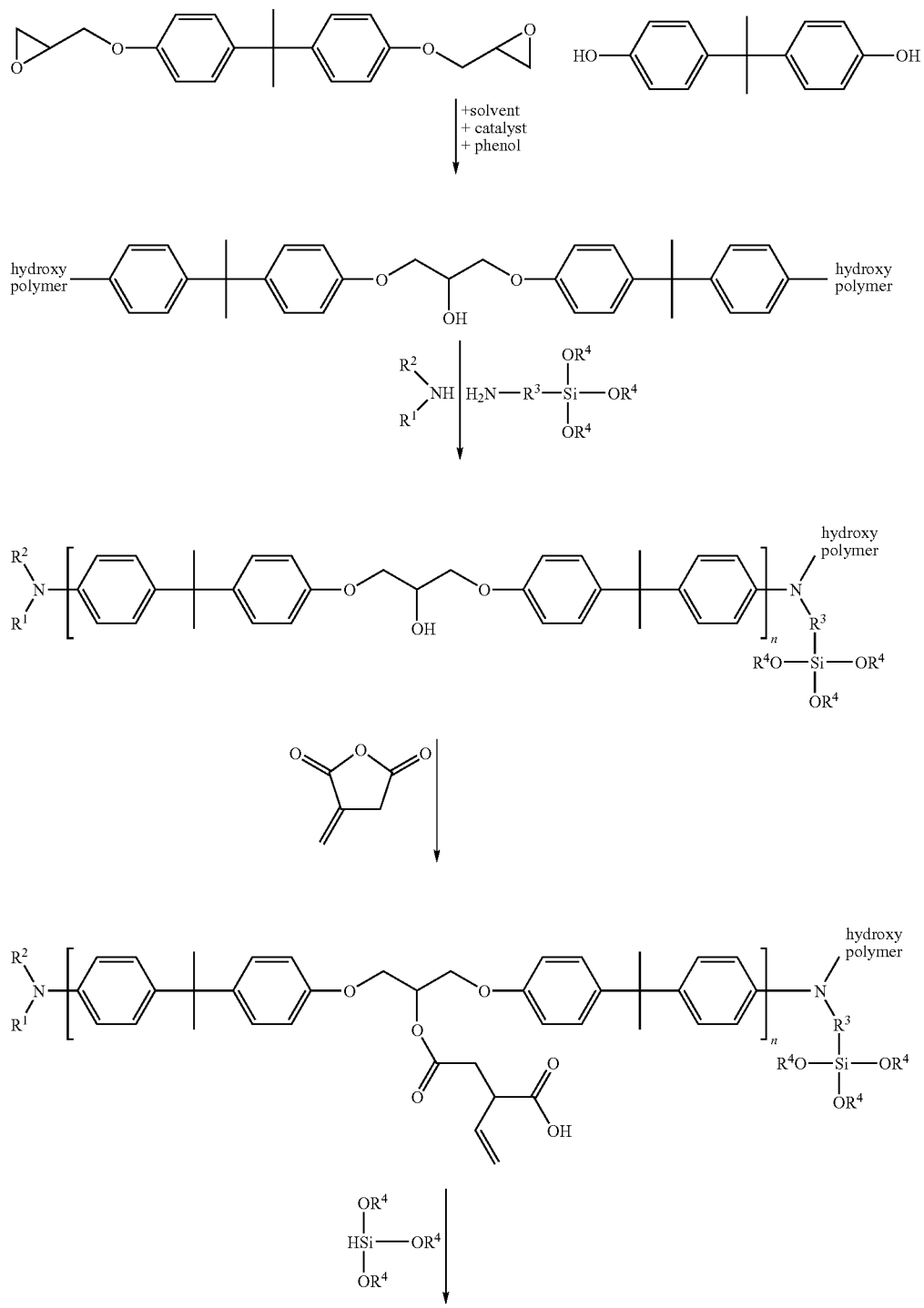

-continued

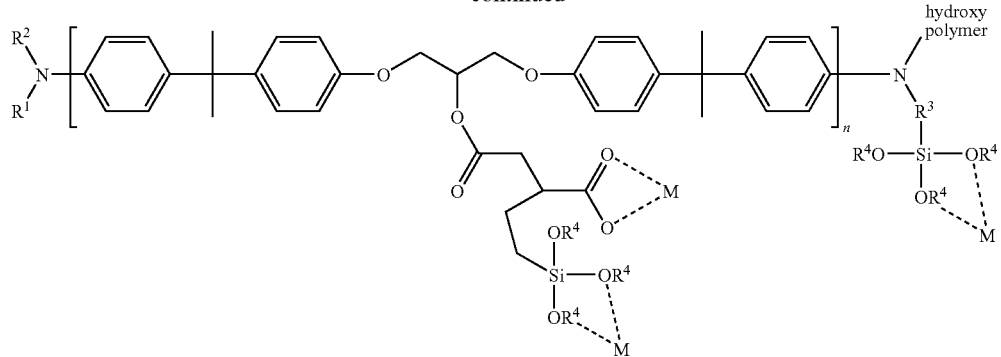

In the synthesis scheme, $R^1$ and $R^2$ are organic groups incorporated by capping with the secondary amine and $R^3$ is an organic group incorporated from the aminoorganotrialkoxysilane. M is a metal from a metal substrate to which the film-forming material is applied, or M is a metal or metal compound, such as a metal catalyst. M includes the following metal species: M, MO, $M_2O_3$, $M(OH)_n$, $R_xMO$, and combinations thereof; wherein, M is a metal selected from the group consisting of Al, Bi, Ce, Cu, Fe, Pb, Sn, Sb, Ti, Y, Zn, and Zr; n is an integer satisfying the valency of M; R is an alkyl or aromatic group; and x is an integer from 1 to 6.

The description of the technology is merely exemplary in nature and, thus, variations that do not depart from the gist of the present invention are intended to be within the scope of the invention. Such variations are not to be regarded as a departure from the spirit and scope of the invention.

What is claimed is:

1. A crosslinker for polymerizing a film-forming material comprising:
   an organic compound including at least two functional groups reactive with a film-forming material and at least one pendent group comprising a —Si(OR)$_3$ group, wherein each R is independently an alkyl group including from 1 to about 12 carbon atoms or an aryl group including substituted and unsubstituted phenyl and benzyl groups, and wherein the at least two functional groups reactive with a film-forming material include isocyanate, blocked isocyanate, uretdione, epoxide, hydroxyl, carboxyl, ester, ether, carbamate, aminoallcanol, aminoalkylether, amide, or amine groups.

2. A crosslinker of claim 1, further comprising a metal or metal compound coordinated by the crosslinker.

3. A crosslinker of claim 2, wherein the metal or metal compound is selected from a group consisting of M, MO, $M_2O_3$, $M(OH)_n$, $R_xMO$, and combinations thereof; wherein, M is a metal selected from the group consisting of Al, Au, Bi, Ce, Cu, Fe, Pb, Sn, Sb, Ti, Y, Zn, and Zr; n is an integer satisfying the valency of M; R is an alkyl or aromatic group; and x is an integer from 1 to 6.

4. A crosslinker of claim 2, wherein the metal or metal compound comprises a metal catalyst selected from a group consisting of dibutyltin oxide, dibutyltin dilaurate, zinc oxide, bismuth oxide, tin oxide, yttrium oxide, copper oxide, and combinations thereof.

5. A crosslinker for polymerizing a film-forming material comprising a structure:

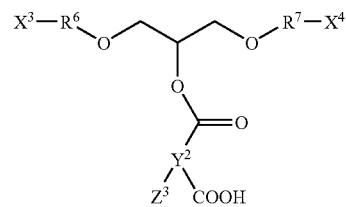

wherein,
$X^3$ and $X^4$ are independently hydroxyl, epoxide, isocyanate, blocked isocyanate, or amine functional monovalent radicals;
$R^6$ and $R^7$ are independently organic divalent radicals;
$Y^2$ is an organic trivalent radical having from 1 carbon atom to about 36 carbon atoms; and
$Z^3$ is a monovalent radical comprising —Si(OR)$_3$, wherein each R is independently an alkyl group including from 1 to about 12 carbon atoms or an aryl group including substituted and unsubstituted phenyl and benzyl groups.

6. A crosslinker of claim 5, wherein $R^6$ and $R^7$ are 2,2-diphenylpropane divalent radicals.

* * * * *